UNITED STATES PATENT OFFICE.

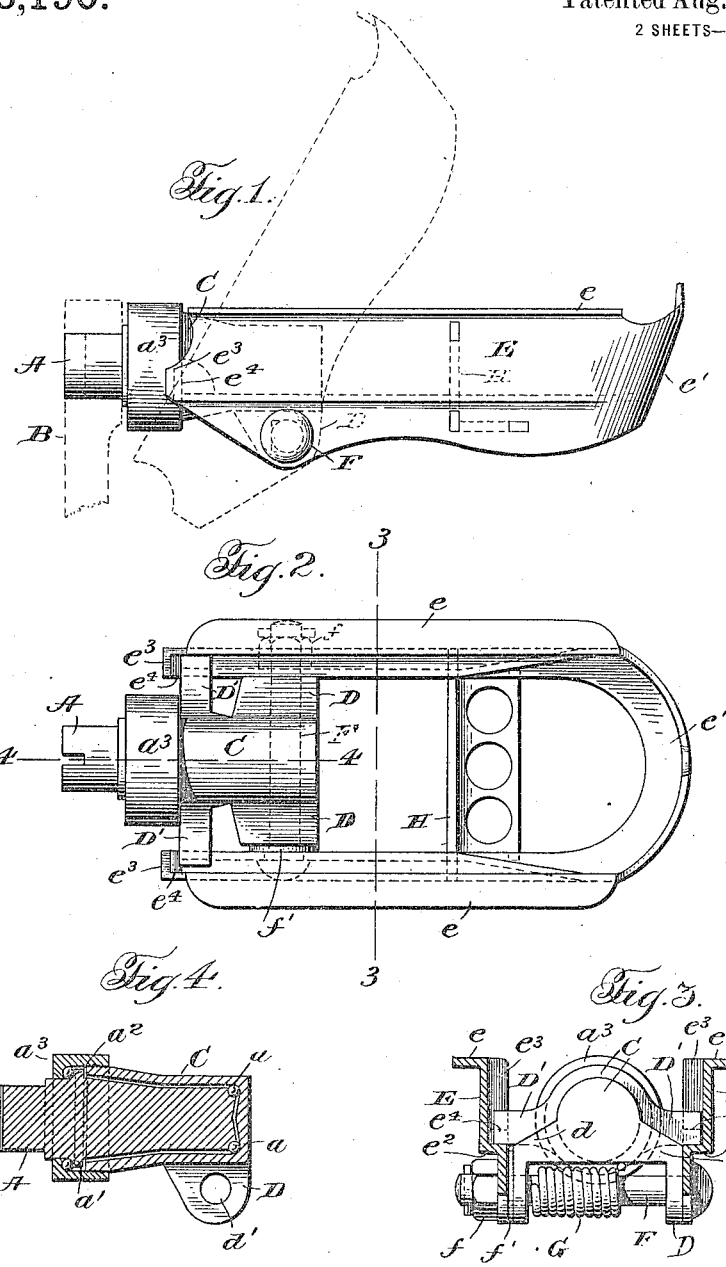

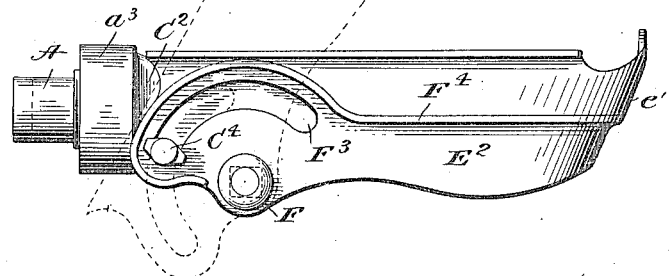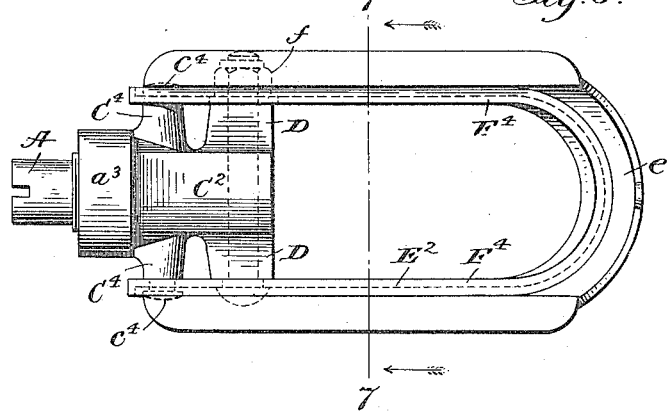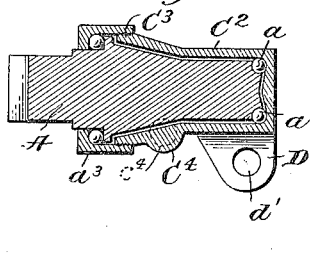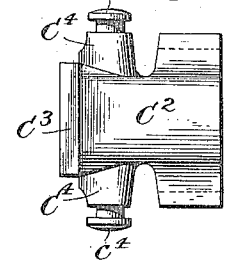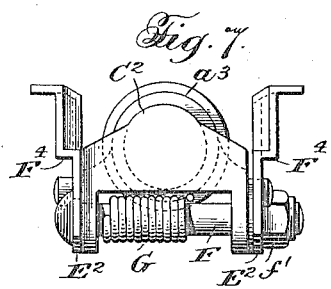

FRANK D. WARREN, OF COLORADO SPRINGS, COLORADO, ASSIGNOR TO THE CYCLE SUPPLIES COMPANY, OF COLORADO SPRINGS, COLORADO, A CORPORATION OF COLORADO.

PEDAL FOR CYCLES.

1,196,190. Specification of Letters Patent. Patented Aug. 29, 1916.

Application filed March 9, 1916. Serial No. 83,097.

*To all whom it may concern:*

Be it known that I, FRANK D. WARREN, a citizen of the United States, residing at Colorado Springs, in the county of El Paso and State of Colorado, have invented certain new and useful Improvements in Pedals for Cycles, of which the following is a specification, reference being had therein to the accompanying drawing.

This invention relates to an improvement in folding pedals for cycles, and especially for motorcycles.

The invention is designed primarily as an improvement on that type of folding pedal shown and described in the United States Letters Patent, No. 1,087,258, dated February 17, 1914. The pedal disclosed in the before mentioned patent has been ascertained to be successful in operation, and one which performs the function and serves well the purposes of the invention, yet it was ascertained that to render the same generally useful for cycle purposes the cost of production was too great, and the present invention may be characterized as one wherein the general principles of the patented invention are embodied in a simpler form, and with parts so positioned and arranged that great strains will be properly resisted, and a pedal produced which will stand up under service conditions for a long period of time with a minimum, or much reduced cost of production.

I have ascertained that when a motorcycle pedal comes in contact with a stationary surface, such as when the machine tips over, the tendency is for the pedal to penetrate the ground and not respond promptly in its deflecting action.

It is one of the objects of the present invention to avoid this condition. I have also ascertained that a pedal of the folding type, arranged according to the plan of the above mentioned patented invention, should be constructed with the fewest possible number of parts, not only with a view of lessening manufacturing costs, but with a view of increasing the general strength of the structure in a manner to resist the usual and expected requirement of service.

The construction illustrated in the accompanying drawings is designed and intended to represent an acceptable commercial form of folding pedal, but the special construction and arrangement may be changed and varied without departing from the nature and principle of the invention. An illustration of one modified form is shown in the accompanying drawing with a view of emphasizing the fact that the invention is not limited to a specific form of structure.

In the drawing Figure 1 illustrates a side elevation of the improvement, parts being shown in section and the pedal proper being shown in dotted lines in its deflected or cushioning position. Fig. 2 is a top plan view. Fig. 3 is a cross section on the line 3—3 of Fig. 2 looking to the left; and Fig. 4 is a longitudinal section through the hub on line 4—4 of Fig. 2. Fig. 5 is a view similar to Fig. 1 showing a slightly modified form. Fig. 6 is a plan view of the same. Fig. 7 is a cross section on the line 7—7 of Fig. 6. Fig. 8 is a longitudinal section of the hub; and Fig. 9 is a detail plan view of the hub.

The improved pedal comprises in the combination the spindle part A, which is attached in any convenient manner to the pedal crank B, shown in section in Fig. 1. The spindle is conveniently of single forging, having a ball race-way formed in the periphery of its extreme outer end, and in which balls $a$ are placed. A similar raceway is formed near the attaching end as at $a'$, in which suitable balls are placed. Conveniently an annular shoulder $a^2$ is formed adjacent the ball-race $a'$.

C designates the hub, which is preferably made of a single piece forging, and is chambered to embrace the outer end of the spindle A. The closed end of the chamber is fashioned to constitute complementary raceways for the balls $a$ while the extreme inner end of the hub is threaded to receive the bearing collar $a^3$, which is provided with an inturned flange formed with a race-way for the innermost ball bearing. The collar $a^3$ maintains the hub in proper position on the spindle, and by its adjustment on the hub the various ball bearings may be properly adjusted.

Extending laterally and conveniently horizontally from opposite sides of the hub at a point adjacent to the collar $a^3$ are the stops or lugs D', their under surfaces being arranged on a plane slightly below the central axis of the hub as shown in Fig. 3. Formed integrally with the hub C, adjacent its outer end, are the relatively spaced apart depending fulcrum ears D, the same having enlarged and strengthened hub connecting parts $d$. The ears are perforated as at $d'$, the perforation of one ear being in exact alinement with that of the companion ear. These ears, as will be noted by reference to Figs. 3 and 4, project well below the plane of the hub, and, as stated, are located on the outer end of the hub for purposes presently to be stated.

E designates the pedal frame which is conveniently formed of a single piece of metal stamped, or bent, into substantially U-shape. The upper surface of the frame is provided with foot rests $e$, which are in the form of outwardly projecting flanges extending along the sides of the frame. The frame has its outer portions beveled or inclined as at $e'$, the inclination being continued throughout the curved outer end part of the frame as shown in Figs. 1 and 2. Extending longitudinally of the side bars of the frame below the foot rests, or grips, is a horizontal longitudinally disposed ledge, or shoulder $e^2$. The innermost ends of the sides of the frame are bent in at right angles as shown in Fig. 2 at $e^3$, while the metal constituting the ledge $e^2$ at the extreme end is severed longitudinally from the side bar of the frame, and bent up at right angles thereto as at $e^4$. These two parts $e^3$ and $e^4$, when bent in their shown position, and when the parts are assembled, occupy positions directly back of the projecting lugs D' of the hub part. To form a close contact between the parts $e^3$, $e^4$ and the lugs D' the latter are preferably constructed with straight rear and under faces as shown in Fig. 1. The lower part of the side bars of the frame adjacent the rear thereof are extended downward and are perforated, the perforations in the parts when assembled being in line with the perforations in the ears D.

F represents the pivot bolt passing through the perforations of the pedal frame and of the ears D serving as a fulcrum upon which the pedal may rock, and also serving as means for uniting the otherwise free ends of the pedal frame, thus adding rigidity to the structure. The bolt has sleeved thereon a coil spring G, one end of which is fixedly secured to the bolt, while the other end is carried up to engage the under side of the hub part. The bolt is squared slightly at one end to prevent its rotation in the frame perforations, while the parts thereof which pass through the ears of the hub are free to rotate. By this construction the spring tension normally projects the frame or pedal downward to service position, at the same time permitting its prompt upward deflection when the end of the pedal comes in contact with a stationary object. If desired, the forward part of the pedal frame may be strengthened laterally by a cross plate H.

In practice it has been found that it is necessary to have a sufficient length of hub to insure a proper support and bearing for the pedal, and I have found a hub extending approximately one-third of the length of the pedal frame will serve to constitute a very effective and proper support, the spindle being correspondingly projected as indicated in Fig. 4 of the drawing. In self positioning pedals it will be recognized that the tread surface should be maintained upwardly, and by carrying the ears D of the hub, together with the lower part of the pedal frame well below the axis of the hub and spindle, and by placing the spring on the bolt a preponderance of weight will be below the axis. This will tend at all times to maintain the tread surface upward. An additional weight may be added below the axis by forming a horizontal part to the cross bar H as shown in Fig. 1. It is desirable also to have the pedal tilt slightly in a manner described in the beforementioned patent, and the overbalancing of one side of the pedal is accomplished by the employment of the nut $f$ and the washer $f'$, which is conveniently located between the side bar of the frame and one of the ears on the hub. In the patented structure it is found that owing to the size of the hub the foot of the operator was brought in contact with the upper surface of the hub. To avoid this objection, and to enable the full length grip on the foot rest, without engaging any other parts of the structure, the outer end of the hub and correspondingly the spindles are reduced in diameter so that the plane of the surface will be well below the plane of the surface of the treads $e$. This is shown clearly in Fig. 1 of the drawing.

In operation the pedal is normally held in the position shown in full line in Fig. 1. In this position the flat surfaces of the lugs D' fit closely in the angle formed by the ledges $e^2$ and the angle parts or stops formed by the bent portions $e^3$ $e^4$. By this means any pressure on the outer end of the pedal is resisted, both longitudinally and vertically. This enables the employment of relatively light metal framing material. Should the machine fall sidewise, or come in contact with bricks, stones or other surface obstructions at the outer end the obstruction would engage the inclined surface of the pedal frame and tend immediately to deflect the pedal against the spring pressure and thus relieve the machine from sudden shocks, the pedal, therefore, acting somewhat as a shock absorber. Overbalancing of one side of the pedal, which overbalance is always rearward with relation to the machine, also serves to present an inclined surface to any obstruction encountered during the movement of the machine. By locating the fulcrum well below the center and employing a pivot bolt, a very strong union is formed between the parts, representing in that particular a lever of the first class, with a preponderance of metal above the pivot point for resisting the strain. The frame structure is also materially strengthened by the formation of the longitudinal ledge. It has been found that a perfect joint can be secured by the employment of the perforated ears on the hub and the alining perforations in the pedal frame, thus rendering the parts easily assembled while maintaining the requisite rigidity for service purposes.

In Figs. 5, 6, 7, 8 and 9 a structure somewhat similar to that shown in the other figures is shown with slight modifications. The hub part $C^2$ is provided at, or near, the flange $C^3$ with outwardly extending lugs $C^4$, positioned preferably on a plane below the axis of the hub. These arms are provided with oblong integral heads $c^4$. The parts immediately back of the heads are cylindrical and constitute bearings for the frame. The frame $E^2$ has its rear part somewhat enlarged and is formed with a segmental slot $F^3$ of a width to loosely embrace the bearings of the lugs. The frame is provided with a ledge $F^4$, which is continued rearward around the end of the slot $F^3$ to add strength to the end wall thereof. The other features of the structure are substantially the same as the structure heretofore described. To assemble the parts the frame $E^2$ is first positioned so that the projecting ends or overhanging parts of the head $c^4$ of the lug $C^4$ will enter through the slot $F^3$ and by a quarter turn of the frame the head parts will be projected over the edges of the slot, as shown in Fig. 5. This forms an effective interlock. When the pedal is in normal position the lugs $C^4$ engage the end wall of the slots $F^3$ and form an effective stop, retaining the pedal in horizontal position. The relative location of the lugs and the fulcrum is the same as in the other form. By extending the ledge $F^4$ completely around the end of the frame cross bracing may be avoided.

The constructions above described represent commercial forms wherein the requisite rigidity is maintained, a minimum number of parts employed, and structures which will respond promptly to shocks.

It is quite desirable in this type of pedal that there should be a very pronounced preponderance of weight below the axis or hub and that all available parts should be disposed with a view of placing this preponderance of weight on the lower side of the pedal. By overbalancing the pedal it is normally retained in and promptly returned to service position and the tendency to spin is diminished. By employing the small counterweight $f'$ above referred to and positioning it on the bolt it is possible to increase the counterweight by replacing one of smaller diameter with one of larger diameter. This also adds weight to the under side of the pedal.

It is to be understood that the terms employed in the hereinafter claims are to be construed as intending to cover not only the principles and the specific structure, but also modifications which may come within the spirit of the invention.

Having thus described the invention, what I claim as new and desire to secure by Letters Patent is:

1. In a folding pedal, the combination with a spindle of a hub part, depending ears on the outer end of the hub part, stops on the hub part located rearwardly of the ears, a pedal frame having a projection for engaging the stops, and means for pivotally supporting the pedal frame on the ears.

2. In a folding pedal structure a pedal frame having an inclined outer end portion, a hub, means for pivotally supporting the pedal on the hub, and means for normally holding the pedal in service position.

3. In a folding pedal, the combination with a hub, of a pedal frame, means for pivoting the frame to the hub at a point adjacent the outer end of the hub and below the horizontal plane of the axis thereof, a stop on the hub rearwardly of the pivoted connection, and means on the pedal frame for engaging the stop.

4. In a folding pedal, the combination with a hub having ears at its outer end and stops rearward of the ears, of a pedal frame pivotally secured to the ears and provided with a projecting part engaging the stops, a spring for normally positioning the pedal frame for service, the outer end of the pedal frame being inclined, substantially as described.

5. In a folding pedal structure, the combination with a hub having a reduced outer portion, a pedal frame, a pivotal connection between the frame and the hub located on a plane below the hub and a stop on the hub arranged to engage the pedal frame and to retain the pedal in a horizontal position.

6. In a folding pedal structure, the combination with a hub having its outer portion reduced in diameter, of ears on the hub projecting below the plane thereof, stops on the hub positioned rearwardly of the ears and a pedal frame pivotally supported on the ears and having a ledge part for engaging the stops.

7. In a folding pedal structure, the combination with the hub part having on opposite sides of its outer end depending ears and provided adjacent the ears with projecting stops, of a pedal frame having a part thereof projecting below the plane of the hub, a bolt passing through said projected part and through the ears, a spring on the bolt for normally positioning the pedal and means on the pedal frame for engaging the stops.

8. In a folding pedal structure, the combination with a single piece hub member, comprising a bearing part, ears projecting below the bearing part and stops rearwardly of the ears, of a pedal frame having its tread surface located above the plane of the projecting part of the hub, means for pivotally connecting the frame with the ears, projections on the frame for engaging the stops, and means for yieldingly positioning the pedal for service.

9. In a folding pedal structure, the combination with a hub and a pedal frame pivoted thereto, means for limiting the downward movement of the pedal, an inclined outer surface formed on the frame, and means for yieldingly maintaining the pedal in service position.

10. In a pedal structure and in combination a hub, depending ears on the hub, stops on the hub, a U-shaped pedal frame having side parts projecting above and below the plane of the hub, means for pivotally connecting the lower portions of the side parts to the ears, and a spring for normally positioning the pedal for service.

11. In a hinged pedal structure, the combination with a crank and a spindle, of a hub sleeved on the spindle and having a closed outer end, ball bearings positioned between the hub and spindle, a flanged collar for retaining the hub on the spindle, stops on the hub projecting laterally therefrom on opposite sides, ears on the hub projecting downwardly below the plane of the hub, a pedal frame pivotally supported on the ears and having parts engaging the stops, and a spring for normally positioning the pedal for service.

12. In a hinged pedal structure the combination with a hub part, of a pedal frame pivotally connected thereto and having an inclined outer end part with means for normally resisting a pivotal movement of the pedal frame with relation to the hub.

13. A folding pedal structure, comprising a hub part, a frame part pivotally secured to the hub part below the horizontal plane of the axis thereof and having a tread part overlapping and positioned on a plane above the hub part, a stop on the hub part, means on the frame for engaging the stop, and a spring for normally positioning the pedal for service.

14. In a folding pedal structure, and in combination a hub part having depending ears and stops, of a pedal frame having parts extending below the horizontal plane of the hub, a bolt passing through the depending parts of the frame and the ears, means for engaging the stops, a spring on the bolt, arranged to retain the frame in a lowered position, and means on the frame for counterweighting one side of the pedal.

15. In a pedal structure, and in combination with a hub part of a metallic U-shaped frame part, having tread surfaces, a pivoted connection between the lower part of the frame and the hub, means located rearwardly of the pivot for limiting the downward movement of the pedal, and a spring for normally retaining the frame in its lowered position.

16. In a pedal structure, and in combination with a hub provided with ears and stops, of a pedal frame having tread parts and longitudinal ledges, stops at the ends of the ledges for engaging the hub stops, and a pivotal connection between the lower parts of the pedal frame and the ears.

17. In a folding pedal, the combination with a hub, of a frame, means for pivotally connecting the frame to the hub on a plane below the hub comprising a bolt, stops rearwardly of the bolt on the hub, means on the pedal for engaging the stops, and a spring on the bolt for retaining the pedal in service position.

18. In a foldable pedal and in combination with a hub, a pedal frame, means located below the plane of the hub for pivotally uniting the pedal frame to the hub, stops for limiting the downward movement of the frame, a spring for normally positioning the frame for service, and an independent counterweight detachably supported between the frame and the hub and located on one side of the plane of the hub, substantially as described.

19. A foldable pedal for cycles comprising in combination a hub part, a U-shaped frame, a pivot member carried by the hub for uniting the free ends of the frame and the frame to the hub and a spring for maintaining the frame in service position.

20. A foldable pedal for cycles comprising in combination, a hub part, a U-shaped single piece frame, a pivot member uniting the opposite portions of the frame and the frame to the hub, said pivot being arranged below the plane of the axis of the hub, a spring for retaining the frame in service position and means for limiting the downward movement of the frame.

21. A foldable pedal for cycles comprising in combination a hub part, a frame part, alined bearing parts carried by the frame and hub, a single pivot member for uniting the frame to the hub passing through said alined bearing parts and means for normally retaining the frame in service position.

In testimony whereof I hereunto affix my signature in the presence of two witnesses.

FRANK D. WARREN.

Witnesses:
 ALFRED RITTER, Jr.,
 S. J. WALKER.

Copies of this patent may be obtained for five cents each, by addressing the "Commissioner of Patents, Washington, D. C."